United States Patent Office 3,316,262
Patented Apr. 25, 1967

3,316,262
NOVEL 1,2,3-BENZOTRIAZIN-4(3H)-ONES
Klaus Hasspacher and Gerhard Ohnacker, Biberach an der Riss, Germany, assignors to Boehringer Ingelheim G.m.b.H., Ingelheim am Rhine, Germany, a corporation of Germany
No Drawing. Filed Aug. 4, 1964, Ser. No. 387,488
Claims priority, application Germany, Aug. 12, 1963,
T 24,474
9 Claims. (Cl. 260—248)

This invention relates to novel 1,2,3-benzotriazin-4(3H)-one substitution products, as well as to various methods of preparing these compounds.

More particularly, the present invention relates to 1,2,3-benzotriazin-4(3H)-ones of the formula

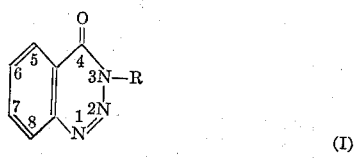

wherein R is straight or branched alkyl of more than two carbon atoms, preferably lower alkyl of 3 to 6 carbon atoms, alkoxyalkyl, haloalkyl of more than one carbon atom or aralkyl whose aromatic moiety may have one or more halogen, lower alkyl or alkoxy substituents attached thereto.

The compounds according to the present invention may be prepared by various methods involving well known chemical principles; however, the following methods have been found to be most convenient and efficient:

METHOD A

By reacting an anthranilic acid amide of the formula

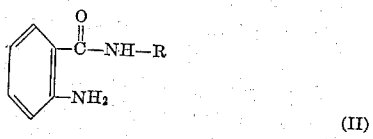

wherein R has the same meanings as in Formula I, with nitrous acid or with a compound which releases nitrous acid under the reaction conditions, such as sodium nitrite, at a temperature below 0° C., preferably in acid aqueous solution.

METHOD B

By reacting an anthranilic acid lower alkyl ester of the formula

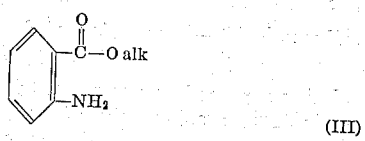

wherein alk is lower alkyl, with nitrous acid or a compound which releases nitrous acid under the reaction conditions, such as sodium nitrite, to form the corresponding diazonium salt and thereafter reacting said diazonium salt with a primary amine of the formula

wherein R has the same meanings as in Formula I. This reaction is also preferably performed in acid aqueous solution.

METHOD C

By reacting a 1,2,3-benzotriazin-4(3H)-one of the formula

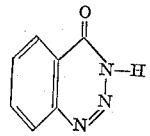

with a compound of the formula

wherein R has the same meanings as in Formula I and Hal is a halogen, in the presence of a compound capable of neutralizing or tying up the hydrogen halide released by the reaction and preferably in the presence of an inert organic solvent, such as chloroform. Examples of compounds capable of neutralizing or tying up the halogen halide are alkali metals, alkali metal amides and alkali metal hydrides.

METHOD D

For the preparation of a compound of the Formula I above wherein R is haloalkyl, by reacting a 1,2,3-benzotriazin-4(3H)-one of the formula

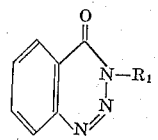

wherein $R_1$ is hydroxyalkyl, with a halogenating agent, such as a phosphorus halide or a thionyl halide, preferably in the presence of an inert organic solvent and of a compound capable of neutralizing or tying up a hydrogen halide, for example, a tertiary organic base such as pyridine or triethylamine. Examples of suitable inert organic solvents are halogenated aliphatic hydrocarbons and aromatic hydrocarbons.

The starting compounds for Method A through D are described in the literature; for instance, the 1,2,3-benzotriazin-4(3H)-ones used as starting materials in Methods C and D are described in J.A.C.S., 77, 6562–6564 (1955).

The following examples further illustrate the present invention and will enable others skilled in the art to understand our invention more completely. It should be understood, however, that the invention is not limited to the particular examples given below.

*Example 1.—Preparation of 3-isopropyl-1,2,3-benzotriazin-4(3H)-one by Method A*

A solution of 10.7 gm. of sodium nitrite in 50 cc. of water was added dropwise to a cooled suspension of 23.2 gm. of anthranilic acid isopropylamide in 220 cc. of 2 N hydrochloric acid at a temperature between −5 and 0° C. while stirring; the sodium nitrite solution was added at a rate such that the internal temperature of the reaction mixture did not rise above 0° C. After all of the sodium nitrite solution had been added, the cooling bath was removed; a precipitate formed about 15 minutes after removal of the cooling bath. The reaction mixture was then stirred for four hours at room temperature, whereupon the precipitate was separated by vacuum filtration. The filter cake was washed thoroughly with water and was then recrystallized from dilute ethanol. The purified product had a melting point of 60–61° C. and was identified to be 3-isopropyl-1,2,3-benzotriazin-4(3H)-one of the formula

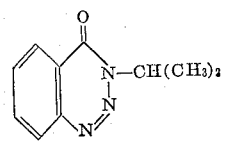

*Example 2.—Preparation of 3-isopropyl-1,2,3-benzotriazin-4(3H)-one by Method B*

The compound prepared in the preceding example was also obtained by diazotizing anthranilic acid methyl ester in aqueous hydrochloric acid solution with sodium nitrite under the conditions of Example 1, and thereafter reacting the diazonium salt obtained thereby with isopropylamine.

*Example 3.—Preparation of 3-n-butyl-1,2,3-benzotriazin-4(3H)-one by Method A*

A solution of 8 gm. of sodium nitrite in 50 cc. of water was added dropwise to a cooled suspension of 180 cc. of 2 N hydrochloric acid at 0° C. while stirring; the sodium nitrite solution was added at a rate such that the internal temperature of the reaction mixture did not rise above 0° C. After all of the sodium nitrite solution had been added the cooling bath was removed and the reaction was brought to completion by stirring the reaction mixture for four hours at room temperature. Thereafter, the reaction solution was extracted several times with ether, the extract solutions were combined and the combined ethereal solution was dried over sodium sulfate. The ether was then evaporated and the oily residue was distilled in vacuo. The fraction passing over at 181–184° C. and 14 mm. Hg solidified upon cooling and had a melting point of 22–23° C. It was identified to be 3-n-butyl-1,2,3-benzotriazin-4(3H)-one of the formula

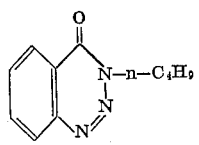

*Example 4.—Preparation of 3-benzyl-1,2,3-benzotriazin-4(3H)-one by Method A*

A solution of 4.9 gm. of sodium nitrite was added dropwise to a cooled suspension of 14.3 gm. of anthranilic acid benzylamide at 0° C. while stirring, taking care that the temperature of the reaction mixture did not rise above 0° C. Thereafter, the reaction mixture was stirred for three hours at room temperature. The precipitate formed during that time was separated by vacuum filtration, washed with water and recrystallized from ethanol. The purified product obtained thereby had a melting point of 122°–123° C. and was identified to be the compound of the formula

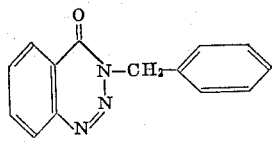

*Example 5.—Preparation of 3-benzyl-1,2,3-benzotriazin-4(3H)-one by Method C*

The compound obtained in the preceding example was also obtained when 1,2,3-benzotriazin-4(3H)-one was reacted with benzyl chloride in xylene in the presence of sodium amide.

*Example 6.—Preparation of 3-(β-chloroethyl)-1,2,3-benzotriazin-4(3H)-one by Method D*

5.7 gm. of 3-(β-hydroxyethyl)-1,2,3-benzotriazin-4(3H)-one were dissolved in 70 cc. of dry chloroform, and 3.9 gm. of thionyl chloride were added dropwise thereto. The reaction mixture was then stirred for two hours at room temperature. Thereafter it was filtered, and the filtrate was evaporated to dryness. The solid residue was recrystallized twice from a small amount of methanol. The product had a melting point of 68–70° C. and was identified to be 3-(β-chloroethyl)-1,2,3-benzotriazin-4(3H)-one of the formula

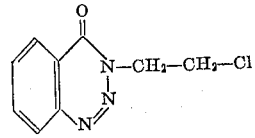

*Example 7.—Preparation of 3-(3'-methoxy-n-propyl)-1,2,3-benzotriazin-4(3H)-one by Method A*

Using a procedure analogous to that described in Example 1, anthranilic acid methoxypropylamide was diazotized with an aqueous solution of sodium nitrite, yielding 3-(3'-methoxy-n-propyl)-1,2,3-benzotriazin-4(3H)-one of the formula

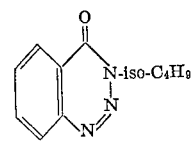

The product had a melting point of 45–47° C.

*Example 8.—Preparation of 3-n-propyl-1,2,3-benzotriazin-4(3H)-one by Method A*

Using a procedure analogous to that described in Example 1, anthranilic acid n-propylamine was diazotized with an aqueous sodium nitrite solution, yielding 3-n-propyl-1,2,3-benzotriazin-4(3H)-one of the formula

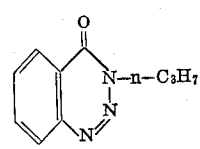

The product had a melting point of 61–62° C.

*Example 9.—Preparation of 3-isobutyl-1,2,3-benzotriazin-4(3H)-one by Method A*

Using a procedure analogous to that described in Example 1, anthranilic acid isobutylamide was diazotized with an aqueous solution of sodium nitrite, yielding 3-isobutyl-1,2,3-benzotriazin-4(3H)-one of the formula

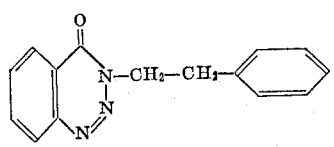

The product had a melting point of 53–54° C.

*Example 10.—Preparation of 3-n-hexyl-1,2,3-benzotriazin-4(3H)-one by Method A*

Using a procedure analogous to that described in Example 1, anthranilic acid n-hexylamide was diazotized with an aqueous solution of sodium nitrite, yielding 3-n-hexyl-1,2,3-benzotriazin-4(3H)-one of the formula

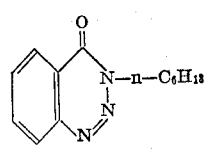

The product had a boiling point of 135–136° C. at 0.05 mm. Hg.

Example 11.—Preparation of 3-(β-phenylethyl)-1,2,3-benzotriazin-4(3H)-one by Method A Using a procedure analogous to that described in Example 1, anthranilic acid β-phenylethylamide was diazotized with an aqueous solution of sodium nitrite, yielding 3-(β-phenylethyl)-1,2,3-benzotriazin-4(3H)-one of the formula

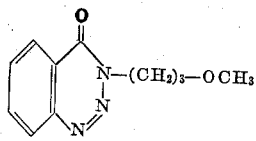

The product had a melting point of 113–115° C.

The novel compounds according to the present invention, that is, those embraced by Formula I above, have useful pharmacodynamic properties. More particularly, they exhibit very effective antiphlogistic, antipyretic, analgesic and sedative activities in animals, coupled wth very low toxicity. Consequently, the compounds of the present invention have an unexpected significantly larged therapeutic ratio than other structually related 1,2,3-benzotriazin-4(3H)-one substitution products described in the prior art.

To demonstrate the unexpected improvement in the therapeutic ratio over homologous compounds, certain lower alkyl-substituted benzotriazinones of the invention were subjected to comparative pharmacological tests for antiphlogistic activity and toxicity with adjacent lower alkyl-substituted benzotriazinones known from the prior art. More particularly, the following compounds were selected for comparison:

A. 3-methyl-1,2,3-benzotriazin-4(3H)-one

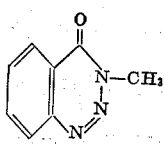

described in J.A.C.S., 77, 6562–6564 (1955).

B. 3-ethyl-1,2,3-benzotriazin-4(3H)-one

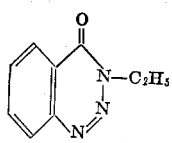

described in J.A.C.S., 77, 6562–6564 (1955).

C. 3-n-propyl-1,2,3-benzotriazin-4(3H)-one prepared acording to Example 8 herein.

D. 3-isopropyl-1,2,3-benzotriazin-4(3H)-one prepared according to Example 1 herein.

These compounds were tested on groups of ten laboratory rats. An edematous condition was artificially induced in one paw of each of the rats by subcutaneous injection of a standard dose of formalin, and after the edema had fully developed the paw was immersed into a graduated container filled with water and the volume of water displaced was measured. Thereafter, the rats were given an intraperitoneal injection of 50 mgm./kg. of the particular compound to be tested for antiphlogistic activity, and after the injection had taken effect the volume of water displaced by the paw was again measured. The percentage reduction of swelling was calculated from these values.

The median lethal intraperitoneal dose was determined by standard procedures for each compound in laboratory mice.

From these values the therapeutic ratio was determined for each compound, that is, the ratio of the median lethal dose ($LD_{50}$) divided by the effective dose ($ED_{50}$) of 50 mgm./kg.

The following table shows the results obtained:

| Compound | Reduction in Swelling Percent | $LD_{50}$, mgm./kg. | Therapeutic Ratio |
|---|---|---|---|
| Prior Art: | | | |
| A | 37 | 242 | 4.9 |
| B | 47 | 255 | 5.1 |
| Invention: | | | |
| C | 54 | 475 | 9.5 |
| D | 32 | 485 | 9.8 |

These results clearly show that while the compounds according to the invention have an approximately equal or somewhat higher effectiveness as antiphlogistics as compared to the homologous prior art compounds, their toxicity is significantly smaller and their therapeutic ratio is about twice that of the lower homologs.

For therapeutic purposes the novel compounds according to the present invention are administered perorally or parenterally as active ingredients in dosage unit compositions consisting essentially of an inert, physiologically compatible carrier and one dosage unit of the active ingredient. One dosage unit of the benzotriazinones of the invention is from 50 to 250 mgm., preferably 100 to 200 mgm. Typical dosage unit compositions are tablets, coated pills, hypodermic solutions, rectal suppositories and the like.

The following examples illustrate a few dosage unit compositions comprising a compound according to the present invention as an active ingredient. The parts are parts by weight.

Example 12

Tablets.—The tablet composition is compounded from the following ingredients:

| | Parts |
|---|---|
| 3-isopropyl-1,2,3-benzotriazin-4(3H)-one | 100.0 |
| Lactose | 100.0 |
| Potato starch | 55.0 |
| Talcum | 15.0 |
| Gelatin | 7.0 |
| Magnesium stearate | 3.0 |
| Total | 280.0 |

Compounding procedure: The benzotriazinone compound, the lactose, the potato starch and the talcum are thoroughly admixed with each other, the mixture is moistened with an aqueous 10% solution of the gelatin, and the moist mass is passed through a 1.5 mm.-mesh screen. The resulting granulate is dried at 40° C., is again passed through the screen, and is then uniformly admixed with the magnesium stearate. The mixture is finally pressed into 280 mgm. tablets. Each tablet contains 100 mgm. of the active ingredient.

Example 13

Coated pills.—The pill core composition is compounded from the following ingredients:

| | Parts |
|---|---|
| 3-isopropyl-1,2,3-benzotriazin-4(3H)-one | 100.0 |
| Corn starch | 40.0 |
| Lactose | 70.0 |
| Polyvinylpyrrolidone | 5.0 |
| Talcum | 3.0 |
| Magnesium stearate | 2.0 |
| Total | 220.0 |

Compounding procedure: The benzotriazinone compound, the corn starch and the lactose are thoroughly admixed with each other, the mixture is moistened with and aqueous 12.5% solution of the polyvinylpyrrolidone, and the moist mass is granulated by passing it through a 1.5 mm.-mesh screen. The granulate is dried at 45° C., passed again through the screen and is then thoroughly admixed with the talcum and the magnesium stearate. The resulting mixture is pressed into 220 mgm. pill cores, which are then coated with a thin shell consisting essentially of sugar and talcum, pursuant to known methods. The coated pills are finally polished with beeswax. Each pill weighs approximately 300 mgm. and contains 100 mgm. of the active ingredient.

*Example 14*

*Suppositories.*—The suppository composition is compounded from the following ingredients:

| | Parts |
|---|---|
| 3-isopropyl-1,2,3-benzotriazin-4(3H)-one | 200.0 |
| Cocoa butter | 1550.0 |
| Total | 1750.0 |

Compounding procedure: The cocoa butter is melted and at about 40° C. the finely powdered benzotriazinone compound is stirred into it. The mixture is homogenized, cooled to 35° C. and poured into cooled suppository molds, each holding 1750 mgm. of the mixture. Each suppository contains 200 mgm. of the active ingredient.

Although the above dosage unit composition examples illustrate only one of the compounds according to the present invention as an active ingredient, it should be understood that any of the other compounds embraced by Formula I may be substituted therefor in the compositions of Examples 12 to14. Moreover, the amount of the active ingredient may be varied within the indicated limits to meet particular requirements, as may the amounts and nature of the inert ingredients.

While the present invention has been illustrated with the aid of certain specific embodiments thereof, it will be readily apparent to others skilled in the art that the invention is not limited to those embodiments and that various changes and modifications may be made without departing from the spirit of the invention or the scope of the appended claims.

We claim:
1. A compound of the formula

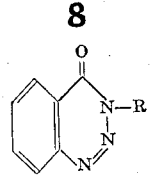

wherein R is selected from the group consisting of alkyl of 3 to 6 carbon atoms, phenyl-lower alkyl, halo-lower alkyl of 2 to 4 carbon atoms and lower alkoxy-lower alkyl.

2. A compound of the formula

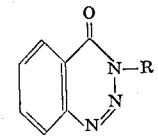

wherein R is selected from the group consisting of akyl of 3 to 6 carbon atoms, benzyl, β-phenyl-ethyl, β-chloroethyl and methoxy-n-propyl.

3. 3-isopropyl-1,2,3-benzotriazin-4-(3H)-one.
4. 3-n-butyl-1,2,3-benzotriazin-4(3H)-one.
5. 3-benzyl-1,2,3-benzotriazin-4(3H)-one.
6. 3(β-chlorethyl)-1,2,3-benzotriazin-4(3H)-one.
7. 3-(γ-methoxy-n-propyl)-1,2,3-benzotriazin-4(3H)-one.
8. 3-n-propyl-1,2,3-benzotriazin-4(3H)-one.
9. 3-isobutyl-1,2,3-benzotriazin-4(3H)-one.

References Cited by the Examiner

UNITED STATES PATENTS 2,843,588   7/1958   Lorenz _____ 260—248

OTHER REFERENCES

Van Heymningen: J. Am. Chem. Soc., vol. 77, p. 6562–5 (1955).

Grammaticakis: Compt. rend, volume 243, pp. 2094–7 (1956).

Katz: J. Chromatog, volume 14 (1), pages 133–5 (1964).

WALTER A. MODANCE, *Primary Examiner.*

JOHN M. FORD, *Assistant Examiner.*

UNITED STATES PATENT OFFICE
CERTIFICATE OF CORRECTION

Patent No. 3,316,262                                      April 25, 1967

Klaus Hasspacher et al.

It is hereby certified that error appears in the above numbered patent requiring correction and that the said Letters Patent should read as corrected below.

Column 2, line 19, for "halogen" read -- hydrogen --; column 4, lines 22 to 27, the formula should appear as shown below instead of as in the patent:

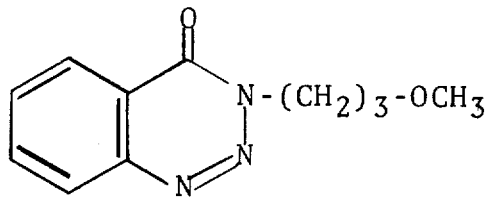

column 4, lines 51 to 58, the formula should appear as shown below instead of as in the patent:

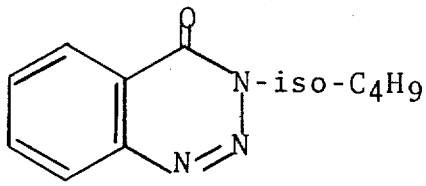

column 5, lines 8 to 14, the formula should appear as shown below instead of as in the patent:

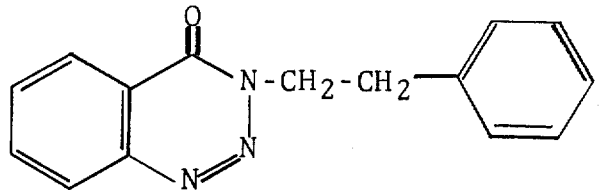

3,316,262 column 5, line 22, for "larged" read -- larger --; column 8, line 18, for "akyl" read -- alkyl --.

Signed and sealed this 28th day of November 1967.

(SEAL)
Attest:

EDWARD M. FLETCHER, JR.
Attesting Officer

EDWARD J. BRENNER
Commissioner of Patents